Patented Dec. 1, 1931

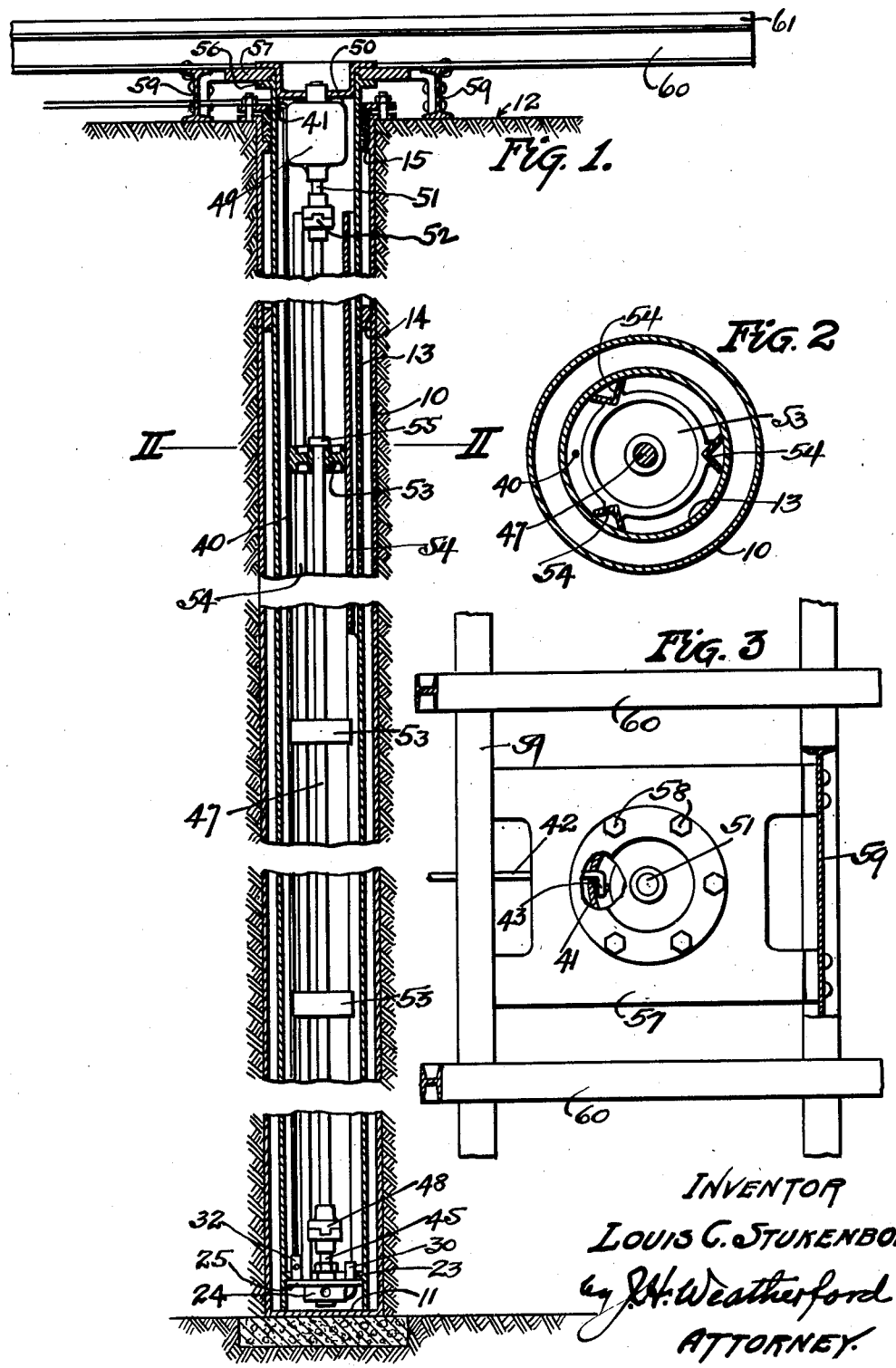

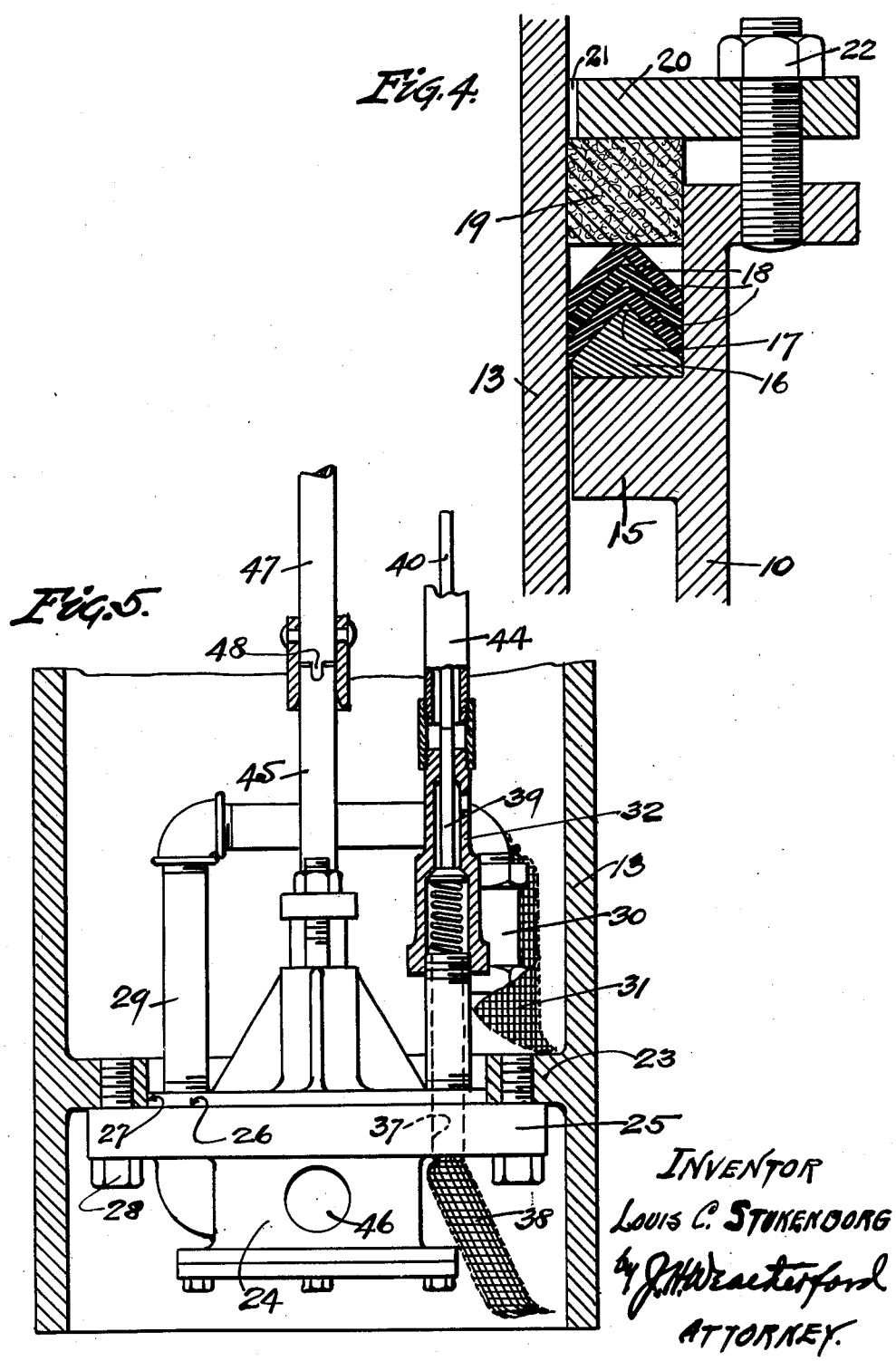

1,834,506

UNITED STATES PATENT OFFICE

LOUIS C. STUKENBORG, OF MEMPHIS, TENNESSEE, ASSIGNOR TO THE STANDARD LIFT COMPANY, OF MEMPHIS, TENNESSEE, A CORPORATION OF DELAWARE

HYDRAULIC ELEVATOR

Application filed February 25, 1929. Serial No. 342,357.

This invention relates to improvements in hydraulic elevators in which a hollow plunger is disposed within a hollow cylinder, and the lift of the plunger is accomplished by forcing liquid into the cylinder, below the plunger.

It has especial relation to the details of construction of the plunger, of the packing therefor, and of the pump shaft guide.

The objects of this invention are:—
(a) To provide an improved packing and gland for the plunger;
(b) To provide an improved construction for the lower end of plunger; and
(c) To provide an improved pump shaft bearing construction intermediate the driving motor and the pump.

The means by which the foregoing and other objects are accomplished and the manner of their accomplishment will readily be understood from the following specification, on reference to the accompanying drawings, in which:

Fig. 1 is a sectional elevation through the cylinder and plunger of a hydraulic elevator;

Fig. 2 is a transverse section taken on the line II—II of Fig. 1;

Fig. 3 is a fragmentary plan showing the plunger head and a portion of the table members;

Fig. 4 is an enlarged view of a portion of the plunger stuffing box and gland and the packing in the stuffing box;

Fig. 5 is a sectional elevation of the lower end of the plunger.

Referring now to the drawings in which the various parts are indicated by numerals, 10 is a hollow cylinder having a closed lower end 11, which cylinder is disposed in a vertical position in a hole dug therefor in the ground, with its upper end substantially level with the ground surface 12.

Disposed in this cylinder is a hollow plunger 13, which is vertically movable therein. 14 and 15 are guiding rings secured to, or integral with, the inner surface of the cylinder which rings guide the plunger. Preferably these rings are of brass and are brazed in the cylinder in usual manner.

The upper ring 15 which in Fig. 4, is shown integral with the wall of the cylinder 10 forms the lower portion of the stuffing box. Preferably this ring contacts rather loosely with the outer surface of the plunger 13. Disposed on the ring 15 is an annular member 16 of triangular A shaped cross section with the upper apex 17 of the triangle rounded. Preferably this annular member 16, is of hard rubber though it may be of metal if so desired. Disposed on this annular member are a number of annular rings 18 of flexible rubber which in cross section are shaped like an inverted V, the under side of the apex of the ring is a sharp V the upper side is rounded in somewhat similar manner to the apex of the member 16. The stuffing box is of such depth that when disposed therein, the top of these annular rings comes below the top of the stuffing box.

19 is a ring of heavy felt packing, impregnated with tallow or like material, which ordinarily is cut from a length of such packing and therefore is not a continuous ring. This ring is preferably of rectangular cross section and projects beyond the stuffing box, taking the place and function of the usual stuffing box gland. 20 is an annular flange which holds this gland in place. The inner diameter of this ring is made substantially greater than the outer diameter of the plunger with which it is used so that a definite space 21 is left therebetween. 22 are the usual gland bolts or studs.

In such a stuffing box it is possible to tighten the gland unequally without causing the gland to bind on the plunger which is of extreme importance in a device of this kind where the relatively large plunger diameter as compared with gland depth precludes the plunger acting as a gland guide while the gland is being tightened. It will be noted also that the felt packing ring rests only on the central portion or apex of the V shaped rubber rings, thus spreading the packing and also allowing the liquid in the cylinder to spread these rings more effectually against both the plunger and the inner surface of the stuffing box and effectually preventing passage of the liquid either along the plunger or along the stuffing box wall. The passage of the liquid is often so effectually cut off that during upward movement of the plunger the oil is stripped cleanly from the plunger and the surface thereof left so dry that during the downward movement there is a tendency of the dry rubber rings to stick to the plunger and be drawn downward therewith, causing wedging and jamming. This action however, is substantially prevented by the lubricant contained in the felt packing ring, or by a small amount of lubricant which may be supplied to the ring and be retained thereby.

The felt packing ring also spreads somewhat between the stuffing box wall and the plunger, forming a guide for the plunger, which cares for all minor strains and effectually preventing chattering. The felt packing therefore serves the triple purpose of gland member to hold down the primary packing, of guide to steady and prevent chattering of the plunger, and of providing secondary lubrication for the packing during downward movement of the plunger. It will be recognized that elevators of the class here described operate with pressures which are in no way comparable with steam or most uses that hydraulic plungers are put to so that the relation of packing friction to total power must be closely watched, and in addition that leakage would be almost fatal. These factors therefore enter largely into the present invention and differentiate it.

Near the lower end of the plunger and therewithin, is an annular abutment 23 which ordinarily is made by welding a ring to the inner wall. This abutment is bored out substantially concentric with the plunger and the lower surface faced. 24 indicates a pump of one of the usual rotary types, which pump is provided with an annular flange 25 slightly less in diameter than the inner diameter of the plunger. The upper surface 26 of this flange is faced inward to a projecting cylindrical shoulder 27 which is turned to a diameter fitting the bore of the abutment 23. The flange 25 is secured to the abutment 23 by bolts or cap screws 28.

The intake to the pump is from the upper or plunger side, preferably through a short line of piping 29, on the end of which is a check valve 30 which prevents back flow through the pump. 31 is a screen, (partially broken away to disclose the check valve 30), which screen prevents the entrance of trash into the check valve. 32 is a pressure release which is provided with a mushroom type valve 33, held against a seat 34 by a spring 35. 36 is a nipple connecting the release with the flange 25 in alignment with an opening 37 therethrough. 38 is a strainer protecting this opening. The mushroom valve 33 is provided with a stem 39 extending upward therefrom which stem may be operated to open the valve by depressing a rod 40 leading to the upper end of the plunger 13. This rod is provided at its upper end with a laterally extending portion 41. 42 is a rod extending along the table to an accessible point, which rod is provided with a laterally extending portion 43 engaging the part 41 of the release rod so that by turning the rod 42 this release may be actuated. Preferably the release rod 40 is enclosed in a pipe 44. 45 is the pump shaft and 46 the pump discharge opening. 47 is a pump shaft extension which may be engaged with the pump shaft 45 by means of a detachable coupling 48.

It will be noted that in the construction above described, the lower head for the plunger is made up of an interiorly disposed annular abutment and a unitary pump and release valve assembled on an annular flange whereby the flange carrying the pump and release valve may be bolted to the abutment to secure the pump and the valve in place and form a bottom head for the plunger.

It will be noted that the check valve 30 may be screwed directly on the vertical portion of the piping 29, or a shorter nipple should it be so desired.

49 indicates an electric motor drive for the pump, this motor is carried by a head member, 50. 51 is the motor shaft which is connected to the pump shaft extension 47 by a detachable coupling 52. 53 are steady bearings for the pump shaft extension. These bearings are carried by three vertically disposed angle irons 54 to which they are secured preferably by welding. 55 is a shaft collar which supports the extension shaft on the upper one of the bearings 53. The bearings and angle irons when assembled together form a unit which may be slid into the plunger 13 from the top thereof and when so placed in the plunger fit snugly but without excessive binding. Preferably the angle irons are extended below the lower bearings and rest on the upper portion of the abutment 23. When in such position the collar 55 is so located as to allow the parts of coupling 48 to engage firmly, but not to carry the shaft weight.

The unit as made up comprises the bearings 53, the supporting angles 54 and the extension shaft 47 mounted in said bearings and supported relatively thereto by the collar 55 and it also includes the extension shaft portions of the couplings 48 and 52.

It will be seen therefore that the plunger is completed by assembling therein a flanged pump unit forming the lower head thereof and may be so shipped; that the extension shaft with its steady bearings and supports may be slid into place in the plunger and be so guided that the parts of the coupling 48 will automatically engage; and that thereafter the motor assembly carried by the head member 50 may be placed and secured with the parts of the coupling 52 engaging.

The plunger 13 is provided with an annular flange 56 on which a head 57 is supported. This head is held in place on the flange 56 by the head member 50 which in turn may be secured by bolts or cap screws 58. To this head 57 oppositely disposed I beams 59 are secured as by bolts or rivets. The length of these I beam members ordinarily being made to conform to the desired width of platform. Carried by these I beams are longitudinal I beams 60 whose length determines the platform length. 61 is the platform planking.

In installing the elevator a hole of sufficient depth is dug and if desired a bed of concrete placed in the bottom thereof. The cylinder is then set in place, made exactly plumb and secured by tamping or otherwise as may be desired. The plunger including the pump assembly is lowered to place within the cylinder, with the stuffing box gland and packing therearound. The packing may then be placed in the stuffing box and the gland secured and slightly tightened. The shaft extension-and-bearing unit is then lowered into the cylinder and the head 57 placed. The plunger is then supplied with such amount of oil as will when all used raise the plunger to the greatest desired height, and the head member 50 carrying the motor is put in place and bolted down, after which the platform planking may be placed and secured.

In using the device current is turned on to the motor and the pump actuated to pump oil from within the plunger into the cylinder until the platform rises to such height as is desired, limited only by the amount of oil within the plunger. To lower the plunger the rod 42 is turned, depressing the rod 40 and opening the release valve thus allowing the oil to flow back from the cylinder into the plunger and the plunger to descend. The descent of the plunger may be stopped at any time by allowing the release valve to close.

Having described my invention, what I claim is:

1. A hydraulic lift unit, comprising a vertical hollow cylinder open at both ends, a flange within said cylinder adjacent the lower end thereof, at right angles to and concentric with the bore of said cylinder, a flanged pump unit centered by said flange, means for securing said pump unit to said flange to form a closure for the bottom of said cylinder, said pump having a vertical centrally disposed shaft, a coupling member carried by the upper end of said shaft; a motor, having a centrally disposed vertical shaft, secured to and centered by the upper end of said cylinder, said shaft having a coupling member on the lower end thereof; and a power transmission unit, comprising a shaft, coupling members on the ends thereof cooperable with said pump and motor coupling members, a plurality of spaced steady bearings for said shaft, a frame slidably disposable within said cylinder and longitudinally removable therefrom and carrying and centering said bearings, in said cylinder, said coupling shaft extending through said bearings.

2. A hydraulic lift unit comprising a vertical hollow cylinder open at both ends, means for securing said pump unit within said cylinder to form a closure for the bottom thereof, said pump unit having a vertical centrally disposed pump shaft, a motor secured within the upper end of said cylinder and having a vertical, centrally disposed motor shaft and a power transmission unit comprising a transmission shaft cooperable with said pump and motor shafts, a plurality of spaced steady bearings for said transmission shaft and a removable frame slidably disposable within said cylinder for carrying and centering said bearings.

3. In a hydraulic lift, a vertical hollow plunger, a motor centered and supported by the upper end of said plunger, said motor having a central vertical shaft with a coupling on the lower end thereof; a rotary pump carried by the lower end of said plunger, said pump having a vertical shaft with a coupling member on the upper end thereof centered by said plunger and an intermediate unit disposed within and centered by said plunger and comprising a transmission shaft having complementary coupling members on the ends thereof, adapted to coact with said motor and pump coupling members, a plurality of steady bearings on said transmission shaft, members, each rigidly secured to the exterior of said bearings for rigidly coupling them together and engaging only the interior surface of the hollow plunger for centering said steady bearings and a collar on said transmission shaft supporting same on a bearing.

In testimony whereof I hereunto affix my signature.

LOUIS C. STUKENBORG.